United States Patent
Goldberg et al.

(10) Patent No.: US 10,002,137 B2
(45) Date of Patent: Jun. 19, 2018

(54) EFFICIENT DATA STORAGE UTILIZATION AND RECYCLING BY GRADUAL DATA DEGRADATION

(71) Applicant: INTERNATIONAL BUSINESS MACHINES CORPORATION, Armonk, NY (US)

(72) Inventors: Itzhack Goldberg, Hadera (IL); Dany Moshkovich, Yokneam Illit (IL); Thorsten Muehge, Budenheim (DE); Erik Rueger, Ockenheim (DE); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 388 days.

(21) Appl. No.: 14/180,058

(22) Filed: Feb. 13, 2014

(65) Prior Publication Data
US 2015/0227544 A1    Aug. 13, 2015

(51) Int. Cl.
*G06F 15/173*    (2006.01)
*G06F 17/30*    (2006.01)

(52) U.S. Cl.
CPC .. *G06F 17/30156* (2013.01); *G06F 17/30117* (2013.01)

(58) Field of Classification Search
CPC ............ G06F 17/30156; G06F 17/30117
See application file for complete search history.

(56) References Cited

U.S. PATENT DOCUMENTS

| | | | | |
|---|---|---|---|---|
| 5,767,921 | A * | 6/1998 | Shyu | H04N 9/74 348/578 |
| 5,907,836 | A * | 5/1999 | Sumita | G06F 17/3061 707/754 |
| 7,751,628 | B1 * | 7/2010 | Reisman | G11B 27/034 382/232 |
| 7,869,700 | B2 * | 1/2011 | MacLean | G11B 27/034 348/699 |
| 8,422,733 | B2 | 4/2013 | Reisman | |
| 2004/0015524 | A1 * | 1/2004 | Chalstrom | G06F 17/30067 |
| 2011/0131664 | A1 * | 6/2011 | Jonsson | G06F 21/10 726/28 |
| 2011/0221965 | A1 * | 9/2011 | Mitchell | H04N 9/7921 348/575 |

OTHER PUBLICATIONS

Rouse, Margaret. "Cache Algorithm". Jan. 2014. Posted at <http://searchstorage.techtarget.com/definition/cache-algorithm>.*

* cited by examiner

*Primary Examiner* — Scott B Christensen
(74) *Attorney, Agent, or Firm* — Griffiths & Seaton PLLC

(57) ABSTRACT

For efficient data storage utilization and recycling, gradually degrading data according to data classes and using degrading data policies, predefined degrading rules, and data access patterns for conserving storage space prior.

18 Claims, 4 Drawing Sheets

EFFICIENT DATA STORAGE UTILIZATION AND RECYCLING BY GRADUAL DATA DEGRADATION

BACKGROUND OF THE INVENTION

Field of the Invention

The present invention relates in general computing systems, and more particularly to, systems and methods for efficient data storage utilization and recycling by gradual data degradation.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Moreover, data, data files, and/or data records are also required to be stored, retained, and/or saved for various periods of time for subsequent retrieval and/or use. Efficiently storing and/or recycling the data, data files, and/or data records data is a key problem to solve, and therefore, a need exists to improve the data storage utilization and recycling.

SUMMARY OF THE INVENTION

In one embodiment, a method is provided for efficient data storage utilization and recycling using a processor device in a computing environment. In one embodiment, by way of example only, data is gradually degraded according to data classes and using one of a plurality of degrading data policies, a plurality of predefined degrading rules, and data access patterns for conserving storage space prior.

In another embodiment, a computer system is provided for efficient data storage utilization and recycling using a processor device, in a computing environment. The computer system includes a computer-readable medium and a processor in operable communication with the computer-readable medium. In one embodiment, by way of example only, the processor gradually degrades data according to data classes and using one of a plurality of degrading data policies, a plurality of predefined degrading rules, and data access patterns for conserving storage space prior.

In a further embodiment, a computer program product is provided for efficient data storage utilization and recycling using a processor device, in a computing environment. The computer-readable storage medium has computer-readable program code portions stored thereon. The computer-readable program code portions include a first executable portion that gradually degrades data according to data classes and using one of a plurality of degrading data policies, a plurality of predefined degrading rules, and data access patterns for conserving storage space prior.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
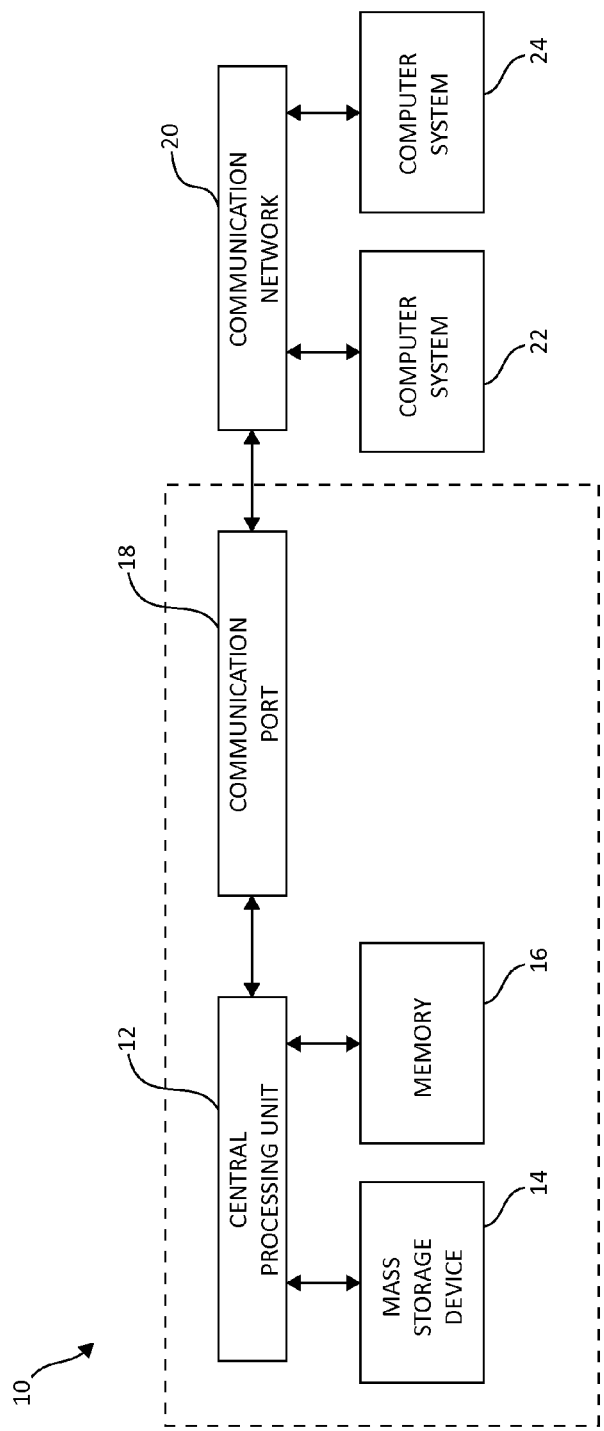
FIG. 1 is a block diagram illustrating a computing system environment having an example storage device in which aspects of the present invention may be realized.

As mentioned previously, efficiently storing and/or recycling the data, data files, and/or data records data is a key problem to solve, and therefore, a need exists to improve the data storage utilization and recycling. Also, recent regulations require the public at large to retain records for many years. Hence, organizations, businesses, governmental agencies or other various types of entities are forced to save data for retrieval and use and some subsequent time period. One of recent techniques to address the ever-growing need for data storage space issue is cloud computing. Recent trends show cloud computing being used as both primary and secondary storage. In one embodiment, a public cloud environment allows for better space share among its many clients through the use of over-provisioning where, every client is granted his requested quota, yet in reality only a fraction of their space is in fact used. Moving data from more accessible/expensive/fast media to less accessible/cheaper/slower archive media also reduces the usage of expensive primary storage.

In one embodiment, data deduplication/compression may be used in reducing storage requirement. In data deduplication (data deduplication refers to the reduction and/or elimination of redundant data), a data object, which may be a file, a data stream, or some other form of data, is broken down into one or more parts called chunks, using a chunking method. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Also, in another embodiment, similar data is recognized and attempts are made to try to delete older/less-quality redundant data generations of that data and, in doing so save the space that used to be taken by those files.

In one embodiment, digital data (e.g., digital multimedia such as audio, video, images or software) is kept for posterity or impose expiration date for efficient storage utilization. However, overtime, data, except for digital data, may gradually [as opposed to abruptly] lose vitality, quality, and/or clarity as matter degrades. It is a fact that much of the stored data is not of high value and retaining such data is counter productive. Deleting unnecessary/redundant data increases computing efficiency and cost savings as it frees scarce/expensive storage space for data that should be kept. Often times seemingly unimportant data, which is destined to be deleted on a given day, may later be determined to be valuable for unforeseen reasons. Thus, allowing for digital data to gradually and slowly lose its quality and space consumption may be employed for increasing storage space yet, allowing for the rarely visited data to be re-used/recovered if and when the need arise. The degraded digital data by definition is not of the same quality and integrity as it was originally, yet with may become useful again. Thus, the present invention provides for slowly and gradually reducing the space consumption of redundant data (e.g., digital data), yet provide means to retain the data useful even in the data's (e.g., digital data) degraded form.

In one embodiment, data and/or files that have not been accessed or read for a long time period (e.g., a determined time period) or may never be accessed, either because their content is outdated or for other reasons are not treated as frequently visited files. However, putting an expiration date on such files tantamount to predicting the future and can result in their ultimate [some times untimely] sudden death. Yet, even rarely used files, such as old release notes or old documents' versions, may still be needed under certain circumstances. In such circumstances the redundant data may then instantly become essential. Completely deleting the data at a specific date is too dramatic and an unrecoverable action. Thus, the present invention induces a decaying factor to archived data or data files for gradually degrading the data (e.g., digital data) overtime. By gradually degrading the data, the data will consume less and less space but, if the gradually degraded data is required to be retrieved, read, and/or accessed prior to reaching a final expiration date, which may be much later than it would have been without the gradually degrading solution, the data may still be found in the degraded shape content and depending on of a multiplicity of decaying operations applied to the data/data files, the data may still be partially and/or fully recoverable. In one embodiment, retrieving, reading, using, and/or accessing the gradually degraded data triggers a new degrading cycle operation and gives a new burst of life. In other words, the data may be dynamically determined to be frequently accessed data and restored (depending on the type of decaying operation and the data class) to the original format, state, or version, determined to be valuable data, and/or the decaying operation applied to the gradually degraded data is reset and restarts for gradually degrading the data. In one embodiment, present invention ensures that the decaying processes is executed in such a way that even the part of the information is lost, essential information (e.g., as defined by a user or application) will not be lost. In other words, the file can still be used, but part of information is lost so the gradually degrading data operation ensures that the decay is executed in a way that the essential information will not be lost.

In one embodiment, for efficient data storage utilization and recycling by a processor device in a computing environment, the present invention gradually degrades data according to data classes and using one of a plurality of degrading data policies, a plurality of predefined degrading rules (e.g., predefined degrading data rules), and data access patterns for conserving storage space prior. A decaying factor is induced by one of a multiplicity of decaying operations for gradually degrading the data over time. Both the quality and resolution is gradually degraded over time until space consumed by the gradually degrading data is to a predefined limit and then deleting the gradually degrading data at a predefined expiration date. The degrading data policies are configured for the data classes according to at least data importance, data types, and/or the data access patterns. The data classes include at least a multimedia class that includes at least photographs, videos, movies, audio, and/or alternative types of multimedia data, and/or a text file class. The degrading data rules are predefined and prioritized by a user. Also, the degrading data rules may be automatically redefined and reprioritized during the gradually degrading of the data. Thus, according to the data classes and using at least one of degrading data policies and at least one of the predefined degrading rules, the data is gradually degraded over time by inducing a decaying factor using a decaying operation for gradually degrading the data over time to a minimum limit. Also according to the data classes and using at least one of degrading data policies and at least one of the predefined degrading rules, both the quality and resolution is gradually degraded over time until space consumed by the gradually degrading data is to a predefined limit, and then the gradually degrading data is deleted at a predefined expiration date For example, consider a colored video taken by a user. The user by set a first rule to begin the gradual degradation of the data by triggering the inducement of the decaying factor The user by set a second rule to degrade pictures from a 36 mega-pixel size to a minimum of 2 mega-pixel size. A third rule may also be predefined indicating that the picture should be reduced from a 64-bit color to a minimum of 30-bit color prior to a final expiration date for deletion. A fourth rule may even be defined to cut the corners off the pictures thereby reducing the size of the overall image. A fifth rule may include the final expiration date. Several other rules may be defined to so that the color picture can be reduced first to a lesser color, then to a deep black and white, and the to a less black and white picture, with each of the reduction of color steps being a step-by-step process occurring over time and not all at once. However, as mentioned above, these rules may even include a predefined triggering event to perform an automatic shutoff of the decaying factor, an automatic restart of the decaying factor, and/or readjusting the predefined minimal limits. For example, if the picture is access, retrieved, and/or viewed during the gradual degradation process, the decaying factor may be restarted with a new decaying cycle.

In one embodiment, by way of example only, the present invention configures the degrading data policies to include the plurality of predefined degrading rules and gradually degrading data policies for reducing sampling frequency for an audio file, reducing a resolution and a number of frames per second for a video file, and storing a summary of content of a text file, converting the text file to short hand text, or deleting a portion of the text while allowing the content to be legible by intelligent agents.

In one embodiment, by way of example only, the present invention gradually degrades the data by at least one of 1) changing colored visual media into black and white visual media, 2) reducing both quality and resolution over time until for reducing image sharpness of the visual media while remaining viewable to a user according to one of a plurality of viewing standards, 3) reducing both resolution and an amount of frames per second for the visual media, 4) reducing a sampling frequency for audio data, and performing an automatic summarization of a text file and retaining only an abstract of the text file, and 5) performing at least one of storing a summary of content of a text file, converting the text file to short hand text, and/or deleting a portion of the text file while allowing the content to be legible by intelligent agents. The intelligent agents include at least a human user. In one embodiment, the present invention gradually degrades the data by file age and/or creation time of the data and/or data file It should be noted that as a general rule, the inducing a decaying factor applies to each of each of the elements described herein such as the changing color to black and white, reducing an image, and reducing a sampling frequency. For, example a 16 million (m) deep color picture can be reduced first to a lesser color, then to a deep black and white, and the to a less black and white picture, with each of the reduction of color steps being a step-by-step process occurring over time and not all at once. Also for the sampling frequency you can reduce this step-by-step process over time and not all at once.

In one embodiment, by way of example only, the present invention converts the gradually degrading data into a reduced quality version compared to an original version/state of the gradually degrading data upon reaching the final expiration date rather than deleting the gradually degrading data, retrieves and recovers a decaying file prior to the final expiration date of the gradually degrading data by identifying a degraded shape of the gradually degrading data, and/or triggers a new degrading cycle for the gradually degrading data if the gradually degrading data is accessed during an identified time period prior to reaching the final expiration date. Such processes may be predefined according to the data class, the gradually degrading data policies and rules set by a user to reach predefined minimum thresholds, minimum limits, reduced versions, and/or minimum standards. Moreover, snapshots may be taken of the various states of the gradually degrading data for maintaining historical versions during the decaying time period, if necessary. The taking, retaining, storing, and maintaining the snapshots/historical versions may also be a predefined as a policy and rule according to the data class and data access patterns.

Thus, unlike the current state of the art, the present invention allows for gradual reactive handling of data over time per actual data classes, data usage patterns, policies, and rules. The present invention focuses on the application of the slow and gradual degradation of data over time and in doing so, balances between the need to save storage space and extending lifespan of files in case the files are required at some later period of time. In one embodiment, each class of the data files is handled and processed differently, according to the data classes, data usage patterns, policies, and rules for the gradual degradation of the data while still allowing for the data to be usable. Each file or class of files are degraded according to their importance, priority, and the specific degrading policies and rules that are to be configured accordingly. Even the data classes themselves may be gradually degraded according to a predefined rule, access pattern, and/or policy. For example, a general policy may first require all text files to remain in an original state while degrading digital media such as audio data. Yet, rules (e.g., the gradually degrading rules) may be defined such that a triggering event listed in the gradual degrading rule may automatically reorder the priority of data classes for the order in which the data classes are gradually degraded. For example, a rule may be defined to terminate the gradual degrading of an audio file if the audio file is accessed prior to reaching a minimum limit, reorder the data class, and require only text file documents to be gradually degraded while terminating and delaying all audio files for a predetermined time. In other words, the gradual degradation of data is automatically and gradually degraded according to the data classes, the data usage patterns, the policies, and/or the rules, all of which may be co-dependent and/or mutually exclusive. In one sense, a policy may control a rule for one type of data class for gradually degrading data. For another type of data class, rules may control and determine the policies. In another setting, the rules and the policies may control the gradually degrading data for all the data classes.

In one embodiment, a large class of files (e.g., the term "large" being defined by a user or by the computing capacity, hardware/software requirements of a computing system) that may be easily degraded may be digital data (e.g., digital multimedia such as, photo's video, movie, images or software). In one embodiment, colored videos, colored movies, colored images, and colored photos may be converted to black and white videos, black and white movies, black and white images, and black and white photos for freeing storage space. In one embodiment, the data's quality, clarity, and/or resolution is reduced over time so that pictures are less sharp yet are still viewable. Also, an option is provided for gradually reducing all or portions of the data's quality, clarity, and/or resolution by an automated process and/or by human intelligence. Also, for the colored videos, colored movies, colored images, and colored photos the present invention may reduce the color deepness, increase the compression rate, and polish the colored videos, colored movies, colored images, and colored photos to decrease noises, increase the size by skipping and/or cutting the boarders. For audio data, the present invention may use a different, best format (e.g., such as moving from MPEG-1 to MPEG-2 format), and/or compression (e.g., compression is more like the compression rate that can be entered in Joint Photographic Expert Group (JPEG) and other compressed file formats such as MPEG-1 to MPEG-2 format) option to eliminate side noises. In other words, for an audio file the sample rate can be reduced and the audio files can also be converted to a text file (e.g., a phone call record can be converted to a text file which need less space as the audio file), and if possible on MPEG-1 to MPEG-2 format.

For example, in one embodiment, a user may select background portions of a photographic images as being the data that is to be gradually degraded while retaining in an original format, version, or state other images (e.g., images of themselves). In one embodiment, the present invention analyzes the video, photographs, pictures, and/or other data and detects important objects like faces, known buildings, known locations/areas and degrades those areas while retaining the original background version/state. Also, at some predefined point in time or identified period, the present invention may summarize any of the digital data (e.g., digital multimedia such as audio, photo's video, movie, images or software) in textual form to merely a name plus location and when of the digital data was taken plus who/what is on the picture (for those who could be recognized by the automatic face/area recognition). In one embodiment, the present invention replaces the speech of the digital data (e.g., digital multimedia such as audio, photo's video, movie, images or software) with text (using speech recognition mechanisms) to degrade the digital data (e.g., digital multimedia such as audio, photo's video, movie, images or software). Also, the digital data (e.g., digital multimedia such as audio, photo's video, movie, images or software) may be degraded to books with pictures by selecting only frames that have new character involved (over some period of time) plus using textual summary of the speech as described herein.

In one embodiment, for documents/text files, the present invention suggest to the document creator to specify explicitly the importance of various parts of the documents and/or data file. This information may then be used to degrade the less important parts first and also assists to summarize the document and/or text file. In addition, the degradation of data may also be applicable to websites where degradation may be done by summarizing the web page text like documents and/or removing poorly visited links and/or web pages or pages.

For video information both the resolution and amount of frames per second may be reduced, and for audio information the sampling frequency may be reduced. Instead of deleting a file at a specific date or after a configured number of inactive days, the files can be transformed from their original state into less quality form.

Text files may also undergo number of transformations (e.g., gradual degradation) before they become unusable and as such good candidates for deletion. In one embodiment, the present invention allows for a document to go through automatic summarization. At the end of the automatic summarization process only the document abstract may be kept. However, the present invention allows for data recovery, if required. In one embodiment, the present invention may remove all of the stop-list words such as: to, in, on etc. which will make their content legible by intelligent agents [e.g., human users] who can make up for those missing words. In one embodiment, the present invention may delete every 'n' word from a text file which again will make the file much less useful yet it may be recovered by an intelligent agent to more or less its original state. In one embodiment, the present invention converts a full text to a short hand text, which may be reversed if needed and allow with some effort to recover the original file. A short hand version of a document by definition will consume much less space than the original. Again, as mentioned herein, the inducing decaying factor is performed during the automatic summarization process. For example, the automatic summarization process may be performed in steps: 1) summarize the detail section, 2) delete sections, and/or 3) keep only the abstract.

In one embodiment, human intelligence may be used at the time of recovery of the text file. For instance, the human intelligence can read and understand the text, which is filled with sparse holes (e.g., every 'n' word a word is deleted). Employing the human intelligence involvement (which is independent of the file meta data and format) may help in reducing file sizes over time at the increase cost of the human active involvement in the recovery efforts. In one embodiment, which doesn't require human involvement, the present invention employs the use of automatic summarization of text or the conversion of the text to its short hand representation.

In one embodiment, rather than a clear cut data deletion from an archive or storage system, there will be assortment of data generation at different stages of degradations by gradual data degradation in case, recovery is needed.

In one embodiment, for video monitoring (e.g., video monitoring at homes, businesses, train stations, airports, etc.), the digital monitor cameras may create a large amount of data that becomes obsolete, outdated, and of limited value as the data ages. For example, after a week without any review requests the data is less important. Yet, as mentioned herein, a situation may occur where the actual date of certain data is or becomes valuable and important. Actual deletion of the data without any chance to recover in case of a request is therefore inefficient and causes significant challenges. By implementing the present invention the data quality will be reduced day-by-day using a degrading operation and decays the data (e.g., the digital data) over time. This reduces the required storage capacity and the deletion period may be increased. By implementing the present invention the original version and/or historical data quality will be reduced by the gradually degradation operations. This reduces the required backup storage capacity and the number of versions and/or histories may be increased.

In one embodiment, the goal of the present invention is to diminish the quality of the multi-media overtime by adding noise. The purpose of the present invention (which is not limited to a particular type of data such as multi-media but applies to all kind of data and describes different approaches relevant to text files or movies etc.) is to degrade the quality of the data until the space the data consumes is zero and then delete it altogether. These are different fields and different goals, though the description uses the same language.

Another differentiating factor of the present invention is the connection to the media context. The fact that the context of the media is known can be used to identify more critical parts and degrade those less critical parts first prior damaging/degrading more critical parts (e.g., as defined by a user). For example if it is known that some of the objects, images, figures, location, areas, shapes, etc., on the picture are less desirable objects, images, figures, locations, areas, shapes, etc., the present invention provides an option to degrade these identified objects, images, figures, location, areas, shapes, etc., that are less desirable first. Another example of the contextual information is the location of place where the digital data (e.g., digital multimedia such as audio, photo's video, movie, images or software) was taken relative to a current regular location of the user. In one embodiment, it is much easier to recreate the digital data (e.g., digital multimedia such as audio, photo's video, movie, images or software) of a place that are easily reachable and may be degraded before digital data (e.g., digital multimedia such as audio, photo's video, movie, images or software) taken on trips to far countries places. In other words, the present invention provides for an option for the user to determine which or any of the digital data (e.g., digital multimedia such as audio, photo's video, movie, images or software) is to be degraded and in what order and at what time periods. This may include allowing a user to define data classes with subclasses that are organized and defined by a user and degraded according to a hierarchical configuration of each data class and each data subclass.

In addition contextual similarity of the media can be used to define redundant media and degrade that redundancy. For example if you have pictures/videos of the same people in the same or near places in different poses (which is not necessarily similar by the pure image/video compare algorithms) you may still degrade some of them.

In one embodiment, the present invention conserves storage space by reducing size of archived digital multimedia data files by degrading quality of the data files gradually over time. More specifically, the present invention configuring specific policies to gradually reduce the size of the archived data files based on importance and type of the files such as, for audio files by reducing sampling frequency, video files by reducing resolution and number of frames per second and text files by storing just summary of content within the text file or by converting to short hand text; and finds a decaying file in their degraded shape content for retrieving and/or recovering decaying file content (partially or fully) before their final expiration.

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
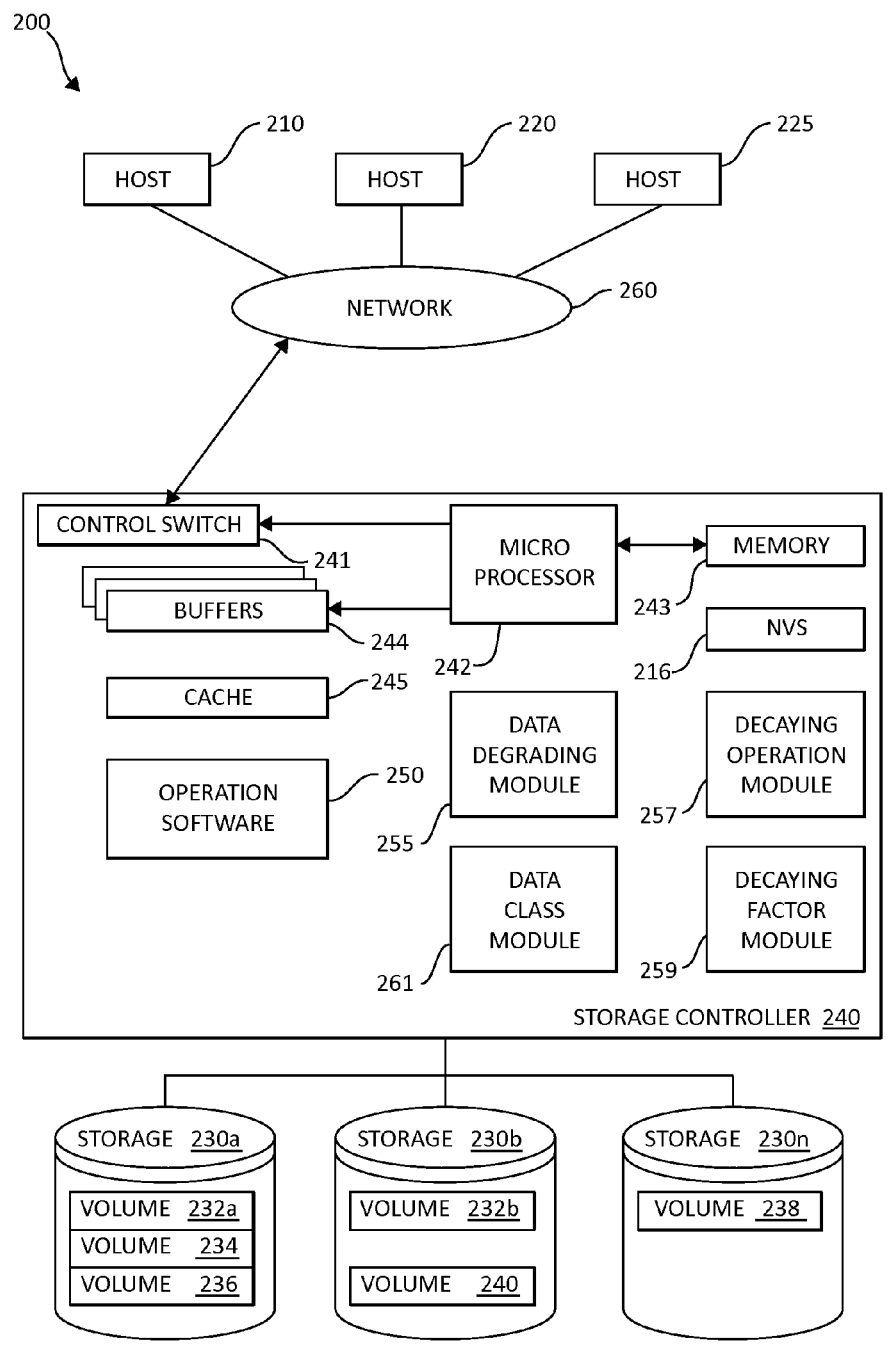
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data degrading module 255, a decaying operation module 257, a decaying factor module 259, and a data class module 261. The data degrading module 255, the decaying operation module 257, the decaying factor module 259, and the data class module 261 may be one complete module functioning simultaneously or separate modules. The data degrading module 255, the decaying operation module 257, the decaying factor module 259, and the data class module 261 may have some internal memory (not shown) and may store unprocessed, processed, or "semi-processed" data. The data degrading module 255, the decaying operation module 257, the decaying factor module 259, and the data class module 261 may work in conjunction with each and every component of the storage controller 240, the hosts 210, 220, 225, and other storage controllers 240 and hosts 210, 220, and 225 that may be remotely connected via the storage fabric 260. Both the data degrading module 255, the decaying operation module 257, the decaying factor module 259, and the data class module 261 may be structurally one complete module or may be associated and/or included with other individual modules. The data degrading module 255, the decaying operation module 257, the decaying factor module 259, and the data class module 261 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the data degrading module 255, the decaying operation module 257, the decaying factor module 259, and the data class module 261 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the data degrading module 255, the decaying operation module 257, the decaying factor module 259, and the data class module 261 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
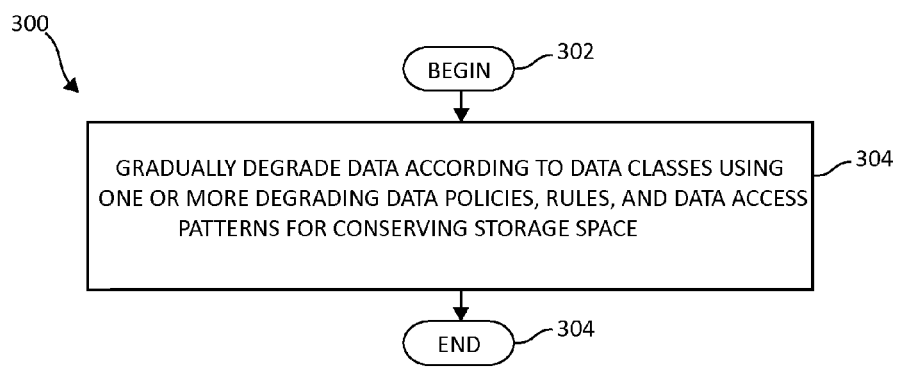
FIG. 3 is a flowchart illustrating an exemplary method for gradually degrading data in which aspects of the present invention may be realized.

In one embodiment, as retained records age without access, the present invention degrades the data to lessen the data storage capacity requirement without deleting the data. Turning to FIG. 3, a flowchart illustrates an exemplary method 300 for destage grouping for sequential fast write tracks is depicted. The method 300 begins (step 302). The method 300 starts by gradually degrading data according to data classes and using one of a multiplicity of degrading data policies, a multiplicity of predefined degrading rules, and data access patterns for conserving storage space prior (step 304). A decaying factor may be induced by one of a multiplicity of decaying operations for gradually degrading the data over time. The method 300 ends (step 306).

Figure 4:
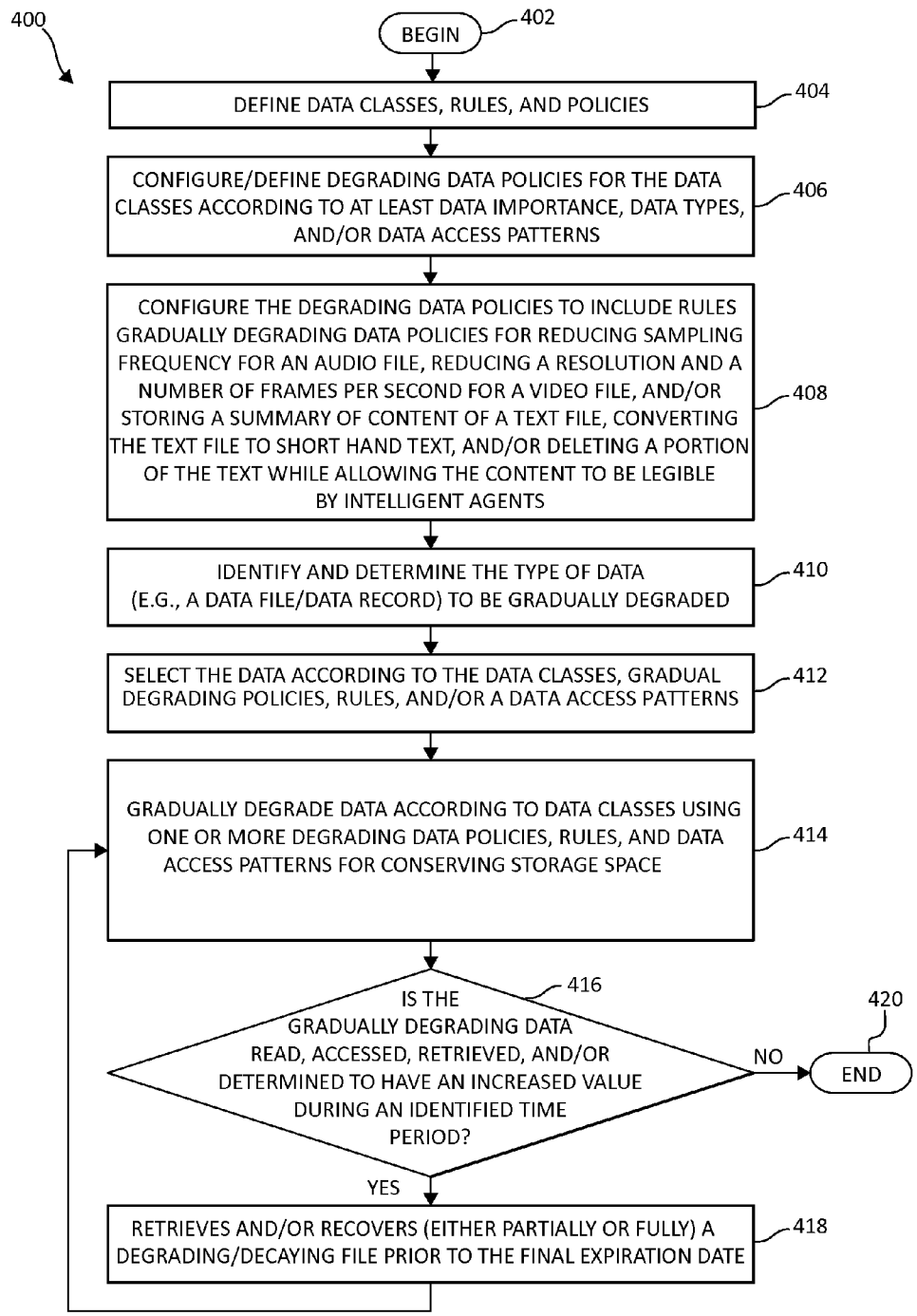
FIG. 4 is a flow chart illustrating an additional exemplary method for gradually degrading data in which aspects of the present invention may be realized.

Turning now to FIG. 4, flowchart illustrates an exemplary method 400 for gradually degrading data is depicted. The method 400 begins (step 402) by defining data classes, gradual degrading rules, and gradual degrading policies (step 404). The method 400 configures the degrading data policies for the data classes according to at least data importance, data types, and/or data access patterns (step 406). The data classes include at least a multimedia class that includes at least photographs, videos, movies, audio, and/or alternative types of multimedia data, and/or a text file class. The data classes may include data subclasses. The method 400 also configures the degrading data policies to include gradually degrading data policies for reducing sampling frequency for an audio file, reducing a resolution and a number of frames per second for a video file, and/or storing a summary of content of a text file, converting the text file to short hand text, and/or deleting a portion of the text while allowing the content to be legible by intelligent agents (step 408).

The method 400 identifies and determines the type of data (e.g., a data file/data record) to be gradually degraded (step 410). The data is categorized into one or more data class. The method 400 selects the data according to the data class, gradual-degrading policies, the gradual degrading rules, and/or data access patterns (step 412). The method 400 gradually degrades the data to a minimum limit according to data class the data is assigned to and using degrading data policies, predefined degrading rules, and data access patterns thereby conserving storage space prior (and/or according to data classes using degrading data policies, predefined degrading rules, and data access patterns for conserving storage space while allowing for recovery of the gradually degraded data prior to a final expiration date of the gradually degrading data (step 414). The method 400 determines if the gradually degrading data is read, accessed, retrieved, and/or determined to have an increased value during an identified time period (step 416). If yes, the method 400 retrieves and recovers (either partially and/or fully) a degrading/decaying file prior to the final expiration date depending on the type of selected decaying operation used for the degrading (step 418). In one embodiment, the method 400 does so by identifying a degraded shape of the gradually degrading data, and/or triggers a new degrading cycle for the gradually degrading data if the gradually degrading data is accessed during an identified time period prior to reaching the final expiration date. In other words, gradually degrading data prior to a final expiration date of the gradually degrading data means to gradually degraded data to a user defined minimum level. For example, the user may request to degrade pictures to a minimum of 2-mega-pixel size with 256 color deep prior to a final expiration date for deletion. The method 400 then returns back to step 414. If no, the method 400 ends (step 420).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc. operated by a processor device) and/or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium (e.g., non-transitory computer-readable storage medium) or a computer readable storage medium (e.g., a non-transitory computer-readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It will also be noted that each block of the block diagrams and/or flowchart illustration, and combinations of blocks in the block diagrams and/or flowchart illustration, is implemented individually as one individual component or aspect of the present invention and/or implemented in combination with each other thereby forming the present invention as one complete block diagram and/or flowchart illustration.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for efficient data storage utilization and recycling by a processor device in a computing environment, the method comprising:
   storing a plurality of data items, each associated with one of a plurality of data classes,
      wherein the data classes include:
         a multimedia class including at least photographs, videos, movies, audio, and a plurality of alternative types of multimedia data, and
         a text class including at least documents,
      wherein
         each data class is associated with one of a plurality of degrading data policies, and
         each data policy includes a plurality of degrading rules to be applied to a corresponding data class of a corresponding data policy, the degrading rules defining data classes to be degraded based on data access patterns per data class to automatically degrade the data items according to each of the plurality of data classes until a predefined expiration date;

defining, by a user, for the data items, essential data which is not to be degraded according to the degrading data policies,
  wherein the defined essential data includes, for different data items:
    certain portions of a photograph,
    certain portions within individual frames of a given one of the videos and movies, and
    certain portions of a given one of the documents,
  wherein when the data items are degraded, the certain portions of each of the data items are retained while other portions of each of the data items are degraded such that the data items are still accessible, while portions that are not defined as the essential data of the data items are lost;
determining the data access patterns of each of the plurality of data items;
gradually degrading each of the plurality of data items based on the determined data access patterns, the associated data classes of the data items, the degrading policy of the associated data class, and the defined essential data; and
based on the user accessing at least one of the data items, resetting, for each of the at least one data items, the gradual degrading and expiration date to begin a new degrading cycle beginning with a current, degraded state of each of the at least one of the data items.

2. The method of claim 1, further including inducing a decaying factor by one of a plurality of decaying operations for gradually degrading the data items over time.

3. The method of claim 1, further including gradually degrading both quality and resolution over time until space consumed by each of the plurality of data items is to a predefined limit and then deleting each of the plurality of data items at the predefined expiration date.

4. The method of claim 1, further including configuring the plurality of degrading data policies for the data classes according to data importance, data types, and the data access patterns.

5. The method of claim 1, further including gradually degrading the data items by at least one of:
  changing colored visual media into black and white visual media,
  reducing both quality and resolution over time until for reducing image sharpness of the visual media while remaining viewable to the user according to one of a plurality of viewing standards,
  reducing both resolution and an amount of frames per second for the visual media,
  reducing a sampling frequency for audio data, and
  performing an automatic summarization of a text file and retaining only an abstract of the text file, and
  performing at least one of storing a summary of content of a text file, converting the text file to short hand text, and deleting a portion of the text file while allowing the content to be legible by intelligent agents.

6. The method of claim 1, further including performing one of:
  converting the data items into reduced quality version compared to an original state of the data items upon reaching the predefined expiration date rather than deleting the data items,
  retrieving and recovering a decaying file prior to the predefined expiration date of the data items by identifying a degraded shape of the data items, and
  triggering the new degrading cycle for the at least one of the plurality of data items if the at least one of the plurality of data items is accessed during an identified time period prior to reaching the predefined expiration date.

7. A system for efficient data storage utilization and recycling in a computing environment, the system comprising:
  at least one processor device operable in the computing storage environment, wherein processor device:
  stores a plurality of data items, each associated with one of a plurality of data classes,
    wherein the data classes include:
      a multimedia class including at least photographs, videos, movies, audio, and a plurality of alternative types of multimedia data, and
      a text class including at least documents,
    wherein
      each data class is associated with one of a plurality of degrading data policies, and
      each data policy includes a plurality of degrading rules to be applied to a corresponding data class of a corresponding data policy, the degrading rules defining data classes to be degraded based on data access patterns per data class to automatically degrade the data items according to each of the plurality of data classes until a predefined expiration date;
  defines, by input of a user, for the data items, essential data which is not to be degraded according to the degrading data policies,
    wherein the defined essential data includes, for different data items:
      certain portions of a photograph,
      certain portions within individual frames of a given one of the videos and movies, and
      certain portions of a given one of the documents,
    wherein when the data items are degraded, the certain portions of each of the data items are retained while other portions of each of the data items are degraded such that the data items are still accessible, while portions that are not defined as the essential data of the data items are lost;
  determines the data access patterns of each of the plurality of data items;
  gradually degrades each of the plurality of data items based on the determined data access patterns, the associated data classes of the data items, the degrading policy of the associated data class, and the defined essential data; and
  based on the user accessing at least one of the data items, resets, for each of the at least one data items, the gradual degrading and expiration date to begin a new degrading cycle beginning with a current, degraded state of each of the at least one of the data items.

8. The system of claim 7, wherein the at least one processor device induces a decaying factor by one of a plurality of decaying operations for gradually degrading the data items over time.

9. The system of claim 7, wherein the at least one processor device gradually degrades both quality and resolution over time until space consumed by each of the plurality of data items is to a predefined limit and then deleting each of the plurality of data items at the predefined expiration date.

10. The system of claim 7, wherein the at least one processor device configures the plurality of degrading data policies for the data classes according to data importance, data types, and the data access patterns.

11. The system of claim 7, wherein the at least one processor device gradually degrades the data items by at least one of:
- changing colored visual media into black and white visual media,
- reducing both quality and resolution over time until for reducing image sharpness of the visual media while remaining viewable to the user according to one of a plurality of viewing standards,
- reducing both resolution and an amount of frames per second for the visual media,
- reducing a sampling frequency for audio data, and
- performing an automatic summarization of a text file and retaining only an abstract of the text file, and
- performing at least one of storing a summary of content of a text file, converting the text file to short hand text, and deleting a portion of the text file while allowing the content to be legible by intelligent agents.

12. The system of claim 7, wherein the at least one processor device performs one of:
- converting the data items into reduced quality version compared to an original state of the data items upon reaching the predefined expiration date rather than deleting the data items,
- retrieving and recovering a decaying file prior to the predefined expiration date of the data items by identifying a degraded shape of the data items, and
- triggering the new degrading cycle for the at least one of the plurality of data items if the at least one of the plurality of data items is accessed during an identified time period prior to reaching the predefined expiration date.

13. A computer program product for efficient data storage utilization and recycling in a computing environment by a processor device, the computer program product comprising a non-transitory computer-readable storage medium having computer-readable program code portions stored therein, the computer-readable program code portions comprising:
- a first executable portion that:
  - stores a plurality of data items, each associated with one of a plurality of data classes,
    wherein the data classes include:
    - a multimedia class including at least photographs, videos, movies, audio, and a plurality of alternative types of multimedia data, and
    - a text class including at least documents,
    wherein
    - each data class is associated with one of a plurality of degrading data policies, and
    - each data policy includes a plurality of degrading rules to be applied to a corresponding data class of a corresponding data policy, the degrading rules defining data classes to be degraded based on data access patterns per data class to automatically degrade the data items according to each of the plurality of data classes until a predefined expiration date;
  - defines, by input of a user, for the data items, essential data which is not to be degraded according to the degrading data policies,
    wherein the defined essential data includes, for different data items:
    - certain portions of a photograph,
    - certain portions within individual frames of a given one of the videos and movies, and
    - certain portions of a given one of the documents,
    wherein when the data items are degraded, the certain portions of each of the data items are retained while other portions of each of the data items are degraded such that the data items are still accessible, while portions that are not defined as the essential data of the data items are lost;
  - determines the data access patterns of each of the plurality of data items;
  - gradually degrades each of the plurality of data items based on the determined data access patterns, the associated data classes of the data items, the degrading policy of the associated data class, and the defined essential data; and
  - based on the user accessing at least one of the data items, resets, for each of the at least one data items, the gradual degrading and expiration date to begin a new degrading cycle beginning with a current, degraded state of each of the at least one of the data items.

14. The computer program product of claim 13, further including a second executable portion that induces a decaying factor by one of a plurality of decaying operations for gradually degrading the data items over time.

15. The computer program product of claim 13, further including a second executable portion that gradually degrades both quality and resolution over time until space consumed by each of the plurality of data items is to a predefined limit and then deleting each of the plurality of data items at the predefined expiration date.

16. The computer program product of claim 13, further including a second executable portion that configures the plurality of degrading data policies for the data classes according to data importance, data types, and the data access patterns.

17. The computer program product of claim 13, further including a second executable portion that gradually degrades the data items by at least one of:
- changing colored visual media into black and white visual media,
- reducing both quality and resolution over time until for reducing image sharpness of the visual media while remaining viewable to the user according to one of a plurality of viewing standards,
- reducing both resolution and an amount of frames per second for the visual media,
- reducing a sampling frequency for audio data, and
- performing an automatic summarization of a text file and retaining only an abstract of the text file, and
- performing at least one of storing a summary of content of a text file, converting the text file to short hand text, and deleting a portion of the text file while allowing the content to be legible by intelligent agents.

18. The computer program product of claim 13, further including a second executable portion that performs one of:
- converting the data items into reduced quality version compared to an original state of the data items upon reaching the predefined expiration date rather than deleting the data items,
- retrieving and recovering a decaying file prior to the predefined expiration date of the data items by identifying a degraded shape of the data items, and
- triggering the new degrading cycle for the at least one of the plurality of data items if the at least one of the plurality of data items is accessed during an identified time period prior to reaching the predefined expiration date.

* * * * *